INVENTORS
J.B. O'MARA, R. G. D'ASCOLI

BY  V F Voek

THEIR AGENT

United States Patent Office 3,355,543
Patented Nov. 28, 1967

3,355,543
HOLLOW-CORE CABLE
Joseph B. O'Mara, Hastings-on-Hudson, and Ralph G. D'Ascoli, Yonkers, N.Y., assignors to Anaconda Wire and Cable Company, a corporation of Delaware
Filed Oct. 22, 1965, Ser. No. 501,424
3 Claims. (Cl. 174—84)

ABSTRACT OF THE DISCLOSURE

Two hollow-core cable conductors are spliced by soldering them around a common tube. The tube has a flange that acts as a stop for both conductors, and is grooved at each end to fit an O-ring. The O-rings seal the space between the tube and the conductors and confines the flow of solder.

---

Our invention relates to a splice in an electric cable and particularly to a splice in a hollow-conductor power cable and a novel connector therefor.

Known types of high-voltage power cables, generally called oil-filled or gas-filled cables, are made with wrapped paper insulation around a hollow conductor, and a metal sheath that contains a dielectric gas or oil. The conductor is made with a hollow core to facilitate the flow of dielectric fluid through the length of the cable.

Our invention provides a splice that does not interrupt the flow of dielectric fluid through the conductor core.

Our invention further provides a splice that does not increase the conductor diameter at the connection.

Our invention further provides a splice that is smooth-surfaced under the insulation.

To achieve these purposes we have invented a copper connector for a hollow-core cable conductor comprising a bored cylinder having an outside diameter closely fitting into the hollow core of the conductor. The cylinder has a circular flange spaced a substantial distance from both ends, the flange being substantially equal in outer diameter to the conductor. There are annular grooves at both ends of the cylinder and annular gaskets fitting the grooves and compressibly extending slightly above the surface of the cylinder whereby solder is prevented from flowing beyond the ends of the cylinder. Preferably the flange will have a radial channel extending to the surface of the cylinder. We have also invented the cable splice comprising two hollow-core cable conductors, a bored cylinder projecting into the hollow core of each of the conductors, a circular flange between the conductors extending radially from the cylinder with the ends of the conductors adjacent to the flange. There are annular grooves at both ends of the cylinder and annular gaskets fitting the grooves and sealing the annular spaces between the cylinder and the conductors and there is metallic solder bonding the cylinder and the conductors and providing electrical continuity between them. In a preferred embodiment of our invention the flange has a radial channel extending from the cylinder. The hollow conductors and the bored cylinder comprise a continuous channel for the flow of dielectric fluid. It will be understood that when we use the word "copper" in this application, we wish to include high-conductivity solderable copper alloys such as bronzes and brasses.

A more thorough understanding of our invention may be gained from a study of the appended drawing.

Figure 1:
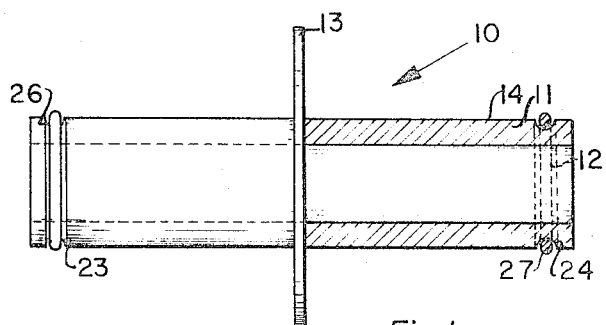
FIGURE 1 shows a side view, partly in section, of a connector of our invention.
Figure 2:
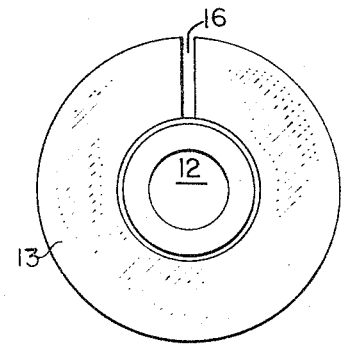
FIGURE 2 shows an end view of the connector of FIGURE 1.

Referring to the drawings the connector, indicated generally by the numeral 10 comprises a copper cylinder 11 having a bore 12 and a flange 13. The flange 13 is fixedly connected to the cylinder 11 and is preferably integral with the cylinder. The connector 10 can, for example, be conveniently machined from a block of copper by drilling out the bore 12 and machining the block down to an outer diameter 14 while leaving the flange 13. Other methods of making the connector 10 such as by casting, or brazing on the flange will be apparent to persons skilled in mechanical arts. The flange 13 is slotted to provide a radial channel 16 extending down to the cylinder diameter 14. The channel 16 provides a means for introducing solder into our splice.

Figure 3:
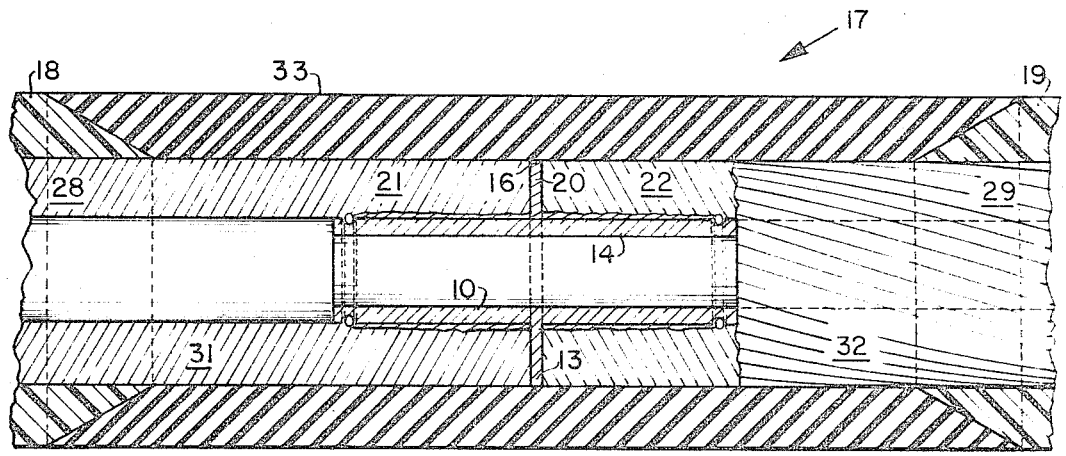
FIGURE 3 shows a side view, partly in section, of a cable splice made to our invention.

The connector 10 is used to make a splice, indicated generally by the numeral 17 (FIGURE 3) between two cables 18, 19 having hollow conductors 21, 22. The diameter 14 is chosen to provide a close fit into the conductors 21, 22 and the bore 12 provides a passage for fluid between the conductors. When the cylinder 11 is inserted into a hollow conductor the flange 13 provides a stop that assures it is inserted the proper distance and prevents it from pushing further into the first conductor when it is inserted into the second conductor. It is preferable, but not limiting, to have the flange 13 centered on the cylinder 11. We have shown the cylinder 11 to be uniform in diameter. This, of course, is necessary when it is used to connect two identical conductors but if it is desired to connect conductors having different core sizes, the connector 10 can be made with a different diameter on each side of the flange 13. The splice 17 has the channel 16 uppermost and after the connector 10 has been inserted into the conductors 18, 19 with the ends of the conductors brought up against the flange 13, solder 20 is poured into the channel 16 sufficient to bond the conductors to the connector.

It is desired, however, to prevent the solder from pouring into the hollow cores of the conductors and for this purpose we have provided annular grooves 23, 24 in the cylinder 11, into which are fitted compressible gaskets 26, 27.

It will be understood that the conductors 21, 22 are comprised usually of stranded wires and that the inner core diameters are not controllable within very precise limits, such, for example, as are possible for precision machine parts. There is, therefore, a considerable tolerance in the fitting of the cylinder 11 into the conductors 21, 22 which would allow the solder to leak past the connector if we did not provide the gaskets 23, 24. These gaskets may conveniently be in the form of O-rings and may be neoprene, silicone rubber, polytetrafluoroethylene or other material that is not dissolved or otherwise adversely affected by the dielectric fluid nor melted or decomposed by the solder 20.

In preparing the splice 17, cable insulations 28, 29 are tapered down to the conductor in the usual manner, leaving combined lengths 31, 32 of bare conductor exceeding the length of the connector, so that the heat of soldering will not damage the insulation. The ends of the conductors 21, 22 are cut square and the connector 10 is inserted by compressing the gaskets 26, 27 until the ends of the conductors are flush against the flange 13 with the channel 16 opening upwardly. Heat is then applied to the flange and the adjacent conductors with a torch while a low-melting solder is introduced into the channel 16. A suitable solder is one having a composition of 97.5% tin and 2.5% silver, and the splice made with this solder was found to have very low electrical resistance and high tensile strength.

After the connector has cooled, insulating tapes 33 are wrapped over the metal surfaces in a known manner. Because of the smooth outer surface of our splice the tapes 33 can be wrapped evenly and remain free from wrinkles and creases which might form points of electrical stress concentration.

We have invented a new and useful connector and cable splice for which we desire an award of Letters Patent.

We claim:
1. A copper connector for a hollow-core cable conductor comprising:
   (A) a bored cylinder having an outside diameter closely fitting into the hollow core of said conductor,
   (B) a circular flange spaced a substantial distance from both ends of said cylinder,
      (a) said flange being substantially equal in outer diameter to said conductor,
      (b) said flange having a radial channel extending to the surface of said cylinder,
   (C) annular grooves at both ends of said cylinder,
   (D) annular gaskets fitting said grooves and compressibly extending slightly above the surface of said cylinder, whereby solder is prevented from flowing beyond the ends of said cylinder.
2. A cable splice comprising:
   (A) two hollow-core cable conductors,
   (B) a bored cylinder projecting into the hollow core of each of said conductors,
   (C) a circular flange between said conductors extending radially from said cylinder, the ends of said conductors being adjacent to said flange,
   (D) annular grooves at both ends of said cylinder,
   (E) annular gaskets fitting said grooves and sealing the annular spaces between said cylinder and said conductors, and
   (F) metallic solder bonding said cylinder and said conductors and providing electrical continuity therebetween.
3. A cable splice comprising:
   (A) two hollow-core cable conductors,
   (B) a bored cylinder projecting into the hollow core of each of said conductors,
   (C) a circular flange extending radially from said cylinder between said conductors,
      (a) the ends of said conductors being adjacent to said flange,
      (b) said flange having a radial channel extending from said cylinder,
   (D) metallic solder bonding said cylinder and said conductor and providing electrical continuity therebetween,
   (E) said hollow conductors and said bored cylinder comprising a continuous channel for the flow of dielectric fluid.

References Cited

UNITED STATES PATENTS 2,264,815  12/1941  Thomson.

DARRELL L. CLAY, *Primary Examiner.*

UNITED STATES PATENT OFFICE

CERTIFICATE OF CORRECTION

Patent No. 3,355,543  
November 28, 1967

Joseph B. O'Mara et al.

It is certified that error appears in the above identified patent and that said Letters Patent are hereby corrected as shown below:

In the heading to the drawing, and in the heading to the printed specification, title of invention, "HOLLOW-CORE CABLE", each occurrence, should read -- SPLICE FOR HOLLOW-CORE CABLE --.

Signed and sealed this 12th day of August 1969.

(SEAL)  
Attest:

Edward M. Fletcher, Jr.  
Attesting Officer

WILLIAM E. SCHUYLER, JR.  
Commissioner of Patents